United States Patent Office.

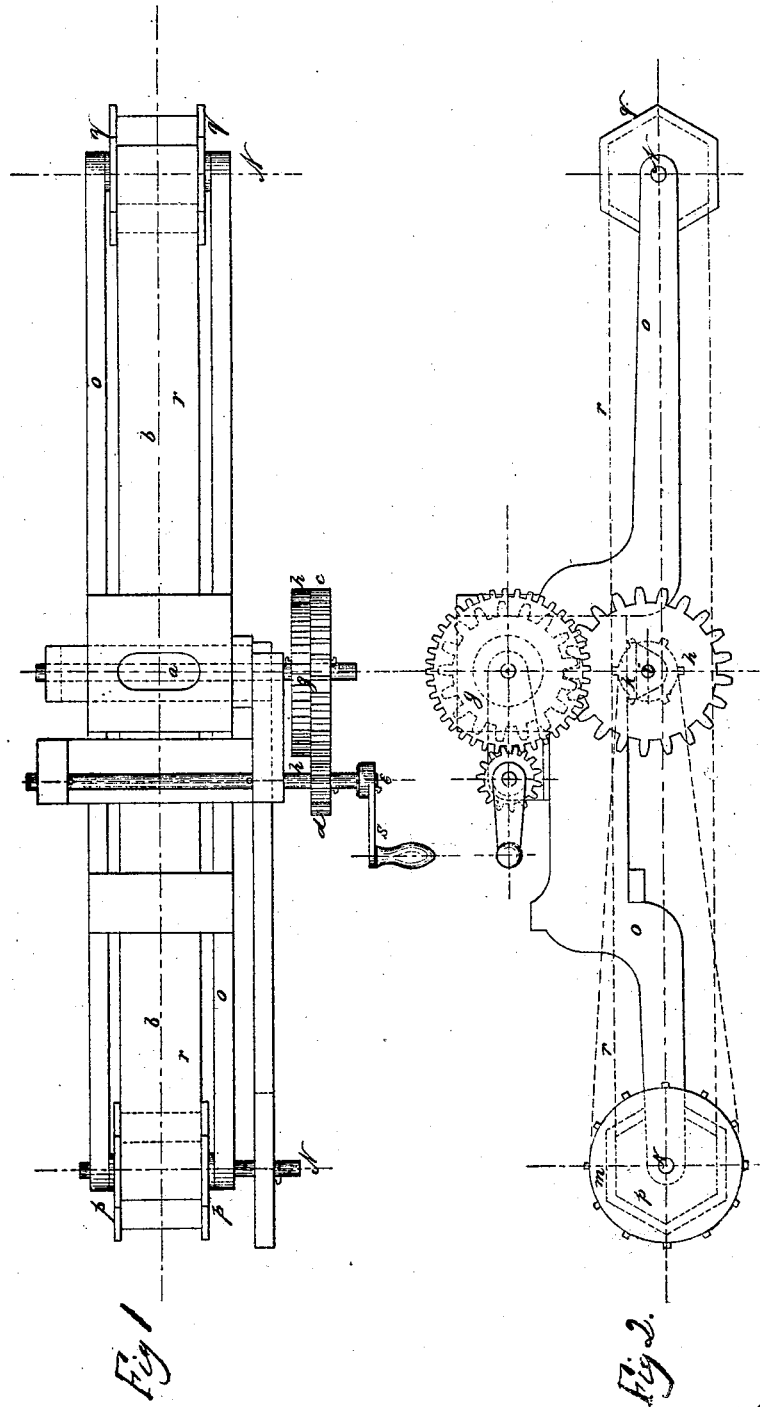

ALFRED SCATCHARD, OF NO. 4, CAMBRIDGE ROAD, MILE END, ENGLAND.

Letters Patent No. 102,325, dated April 26, 1870.

IMPROVED APPARATUS FOR THE MANUFACTURE OF AERATED BREAD.

The Schedule referred to in these Letters Patent and making part of the same

*To all to whom these presents shall come:*

I, ALFRED SCATCHARD, of No. 4 Cambridge Road, Mile End, in the county of Middlesex, England, send greeting: whereas I hereby declare the nature of the said invention, and in what manner the same is to be performed to be particularly described and ascertained by and in the following statement thereof, that is to say, this invention has for its object Improvements in the Apparatus used in the Manufacture of Aerated Bread.

In the manufacture of aerated bread, it is usual to measure out the dough from the mixing-vessel in which it is contained under pressure by means of a measuring-cock or apparatus, which is opened and closed by a hand-lever to produce each loaf, and the operator has also, by a separate operation, to place and remove the tins to receive the loaves, and much time is thus consumed.

Now, according to my invention, I give motion to the measuring-cock or apparatus by means of the gears; I drive it continuously whilst the dough is being drawn off, and underneath the measuring-cock or apparatus I arrange an endless apron, on which the tins to receive the loaves are placed. This apron is also driven continuously, and it is geared with the measuring-cock or apparatus, so that it moves on the distance between the tins during the time between the discharge of one loaf and the next. The gearing may conveniently be, by means of spur-wheels and a pitch-chain. In this way the delivery of the loaves is rendered self-acting, except that the empty tins have to be placed on the endless apron, and removed therefrom when full.

And in order that my said invention may be most fully understood and readily carried into effect, I will proceed to describe the drawings hereunto annexed.

Figure 1 is a plan.

Figure 2 is a side view of the apparatus.

$a$ is the measuring-cock fixed at the bottom of the vessel in which the dough is contained under pressure. It has a piston working in the way or passage through it, as is usual, and as is described in the specification of a patent granted to John Daughlish, or S. T. Bacon, assignee of said patent, and dated 4th day of July, 1865.

Underneath the cock $a$ there is, as heretofore, a passage, $b$, open at the ends, into which the tins or bread-pans are placed.

In place of working the cock by a hand lever and placing the tins by hand in position below the mouth of the cock, as is usual, the cock, as the drawing shows, is driven by a toothed-wheel, $c$, upon it, which gears with a pinion, $d$, on an axis, $e$, and this axis receives motion by means of a driving-belt from any convenient prime-mover. The axis $e$ is driven continuously.

Upon the cock $a$ is also a spur-wheel, $g$, gearing with another larger wheel, $h$, upon an axis, $i$, on which is also a chain-wheel, $k$, and a pitch chain passes from this wheel to another similar wheel, $m$, which is thus driven.

The wheel $m$ is on an axis, $n$, attached to the end of the frame $o$.

$p\ p$ are hexagon drums upon the axis $n$.

At the other end of the machine are other hexagon drums $q\ q$, the axis of which is carried by the frame $o$.

$r\ r$ is an endless apron combined with metal plates, each bent up to form a flange at one edge. These plates are jointed together by wire hinges, so as to adapt the endless apron which they form to pass around the hexagon drums.

The speed at which this apron is driven is such that the cock $a$ makes three revolutions or rotations for each revolution of the hexagon drums. Then, in working the machine, the tins to be filled are to be placed upon the apron $r$ on one end of the machine, and they are carried forward through the passage $b$, the bottom of which supports them whilst on the passage, and as each tin comes under the cock $a$ the motion of the cock causes a measured portion of dough suitable to form a loaf of bread to be dropped into it.

As the tins issue from the passage $b$ after having been filled, they are removed by hand.

What I claim as my invention and improvement, in combination with the device for forming and delivering the loaf, as shown at $a$, is—

1. The arrangement of the gears $d\ c\ g\ h$, shaft $e$ and crank $s$, as described.

2. In combination with the above, the device for carrying the loaf or loaves when formed, by means of an endless apron, $r$, and the hexagon drums $p\ p$, and shafts $n\ n$, as shown and described.

ALFRED SCATCHARD.

Witnesses:
 DAN. FORSHAW,
  24 *Royal Exchange.*
 S. T. BACON.